Apr. 10, 1923.

J. R. JOHNSON

PAN LIFTER

Filed Sept. 6, 1921

Inventor
J. R. Johnson.

By Arthur H. Sturges.
Attorney

Patented Apr. 10, 1923.

1,451,042

UNITED STATES PATENT OFFICE.

JAMES R. JOHNSON, OF OMAHA, NEBRASKA.

PAN LIFTER.

Application filed September 6, 1921. Serial No. 498,681.

*To all whom it may concern:*

Be it known that I, JAMES R. JOHNSON, a citizen of the United States, residing at Omaha, in the county of Douglas and State of Nebraska, have invented certain new and useful Improvements in Pan Lifters, of which the following is a specification.

The present invention relates to devices for handling dishes, plates and the like when cooking, and more particularly relates to a lifter which may be quickly and easily applied to pans, pie-plates and other culinary utensils which have to be conveyed from place to place while hot.

An object of the present invention is to provide a plate and pan lifter of this type which is relatively light in weight, simple in construction, easy to apply to pans and plates, and which may be quickly and easily detached therefrom without danger of upsetting the pan or plate.

Another object of the invention is to provide a pan and plate lifter of this type which is so constructed as not to interfere or come in contact with the top of a cake, a pie or other food or the like placed in the pan or plate and which may be manipulated without danger of contact therewith.

A further object of the invention is to provide a device of this character with a shiftable locking member adapted to firmly hold the clamping parts of the device upon the pan or plate and which may be quickly and easily shifted to release the parts when it is desired to detach the lifter from the article.

The invention still further aims at the provision of means for yieldingly holding the parts in clamping position to prevent the accidental shifting of the shiftable element to thus prevent accidental dropping of a pan or plate by vibration in either lifting up or setting down, or incident to carrying the device.

With the foregoing and other objects in view, the invention will be more fully described hereinafter, and will be more particularly pointed out in the claim appended hereto.

In the drawings, wherein like symbols refer to like or corresponding parts throughout the several views, Fig. 1 is a side elevation of a pan or plate lifter constructed according to the present invention, the same shown as applied to a pie-plate;

Figure 1:
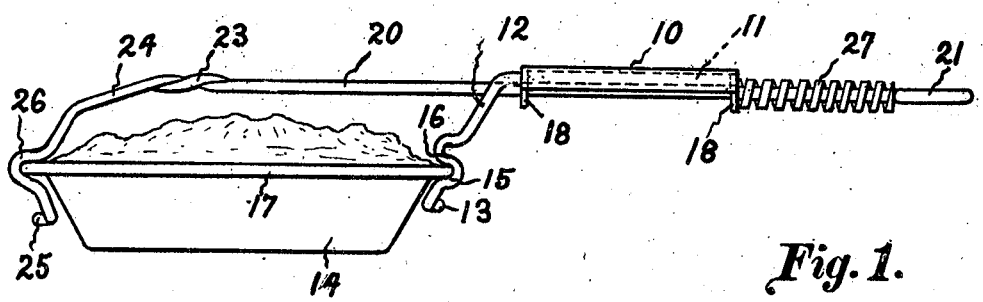

Referring to the drawing, the lifter comprises a pair of relatively movable gripping jaws. The inner jaw comprises a slide 10 which may be formed of sheet metal and having its lateral edge portions rolled over upon the opposite ends 11 of a length of wire. The ends 11 are preferably straight as shown, and terminate at the forward or outer edge of the plate 10 and diverge therefrom to form the diverging connecting pieces 12, which terminate in a cross or bridge piece 13, the portions 12 and 13 comprising a return loop which is bent downwardly from the forward extremities of the ends 11, as shown to advantage in Fig. 1. The bridge piece 13 is arcuated to conform, substantially, to the exterior contours of the side wall of a plate or pan 14, and the side connecting portions 12 are provided each, at a point spaced a short distance above the cross piece 13, with substantially S-shaped off-sets or corrugations forming a forwardly facing shoulder or seat 15 and an over-hanging shoulder 16 adapted to retain the marginal body or flange 17 of the plate 14 upon the seat 15. The plate or metal sheet 10 has a down turned flange 18 at each end and the flange is arranged to extend substantially between the end portions 11 of the body wire which forms the inner jaw.

The flanges 18 are formed with registering apertures 19 through which slidably engage a pair of guide rods 20 forming the side pieces of an outer or second clamping member. The side pieces 20 are of an integral length of wire which has such side portions 20 set in formation and arranged in parallelism for a considerable distance, and the side pieces being laterally arched outward at the inner end of the second jaw to form a handle 21. The extremities of the second length of wire are brought together at the back of the handle as at 22, and welded or otherwise suitably secured together.

Figure 2:
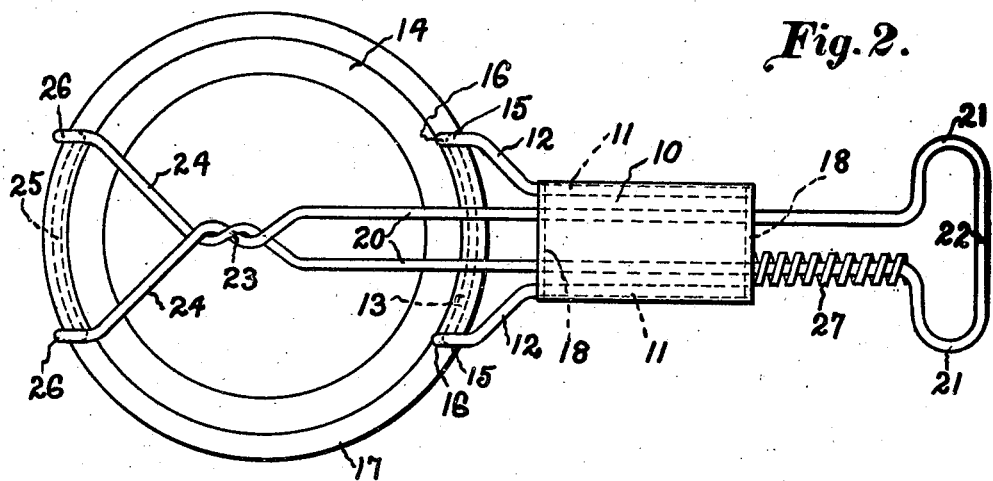
Fig. 2 is a top plan view of the same.
Figure 3:
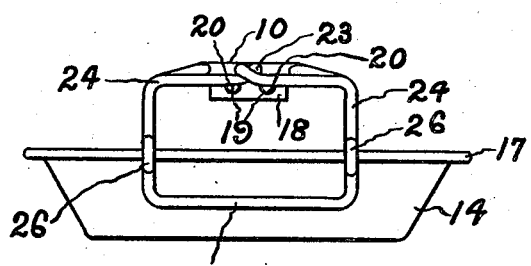
Fig. 3 is an outer end elevation thereof.

The guide rods 20 are brought together at their forward ends and twisted one upon the other to form a relatively strong neck portion 23. The ends of the portion 23 diverging as at 24 are integrally connected together by a cross piece 25 curved to the configuration of the exterior contour of a plate or pan 14 as shown in Fig. 2. The parts 24 and 25 form a return loop which constitutes the main portion of the outer jaw. The side pieces 24 of the outer jaw are arched outwardly to form seats or loops 26 which face inwardly and which are adapted to receive therein the rim or flange 17 of the pan or plate 14. It will be noted particularly from Figs. 1 and 3 that the connecting portions 24 of the outer jaw and 12 of the inner jaw are projected upwardly into a plane spaced considerably above the top of the pan or plate 14 and that the handle portions 10 and 20 of the inner and outer jaws are thus located at a considerable height above the pan so that the device may be manipulated without injury to contents of the plate or pan which project above the rim thereof.

If desired, an expanding spring 27 may be fitted to one of the rods 20 between the handle 21 and the handle plate 10. The spring 17, by its expansion, yieldingly holds the handle portion 10 of the inner jaw outwardly toward the outer jaw to thus contract the jaws and hold the same firmly upon the opposite sides of the plate or pan 14.

It is thought the operation of the lifter will be apparent, for when it is desired to apply the device to a pan, the user merely grasps the handle 21 in one hand and grasps the hand grip or plate 10 in the other hand and pulls the plate 10 backwardly to the handle 21 to spread open the jaws and admit the placing of the device over the container 14. The hand plate 10 is now slid forwardly upon the rods 20, either by hand or by the spring 27, and the shoulders or loops 12 and 26 are brought into contact against opposite sides of the receptacle 14 and are held firmly thereagainst. The rods 20 frictionally bind in the openings 19 of the flange 18 and consequently the parts are held from relative sliding and from vibration.

From Fig. 1 it will be noted that when the device is applied to the receptacle 14, the neck 23 and rods 20 are spaced high above the receptacle so that the material or articles in the pan may project a considerable distance above, as shown, without being disturbed or broken by operation of the clamping jaws.

I do not wish to be restricted to the size, form, and proportions of the various parts, and obviously changes could be made in the construction herein described without departing from the spirit of the invention, it being only necessary that such changes fall within the scope of the appended claim.

What is claimed is:

A pan or plate lifter, comprising a pair of jaw members arranged to grip the opposite edges of a pan and having handle portions composed of substantially parallel wire rod members extending beyond one of said jaw members and with the rod members of the remote jaw of greater length than the other rod members and terminating in a head, a connecting plate arranged across all of said rod members and having end flanges with openings therein through which said rod members pass, the shorter rod members terminating in said flanges of the plate and being secured thereto and the longer rod members being slidable through said flanges, and a spring carried by the longer rod members between said head and the plate for urging the latter and the adjacent jaw member toward the remote jaw member.

In testimony whereof I have affixed my signature in presence of two witnesses.

JAMES R. JOHNSON.

Witnesses:
ARTHUR H. STURGES,
HIRAM A. STURGES.